(12) United States Patent
Toyota

(10) Patent No.: US 9,117,142 B2
(45) Date of Patent: Aug. 25, 2015

(54) IMAGE-FILE PROCESSING APPARATUS, PROGRAM, AND IMAGE-FILE PROCESSING METHOD

(75) Inventor: Minoru Toyota, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 120 days.

(21) Appl. No.: 13/995,297

(22) PCT Filed: Jun. 7, 2012

(86) PCT No.: PCT/JP2012/064670
§ 371 (c)(1),
(2), (4) Date: Jun. 18, 2013

(87) PCT Pub. No.: WO2013/021718
PCT Pub. Date: Feb. 14, 2013

(65) Prior Publication Data
US 2013/0279812 A1    Oct. 24, 2013

(30) Foreign Application Priority Data

Aug. 11, 2011  (JP) .................. 2011-176219

(51) Int. Cl.
*G06K 9/66* (2006.01)
*G06K 9/62* (2006.01)
*G06T 13/80* (2011.01)
*A63F 13/30* (2014.01)

(52) U.S. Cl.
CPC . *G06K 9/62* (2013.01); *A63F 13/12* (2013.01); *G06T 13/80* (2013.01); *A63F 2300/552* (2013.01); *A63F 2300/6607* (2013.01); *A63F 2300/807* (2013.01)

(58) Field of Classification Search
USPC ......... 382/195, 277, 282, 284, 291, 294, 103, 382/107, 219, 278; 358/537, 538, 540
See application file for complete search history.

(56) References Cited

U.S. PATENT DOCUMENTS

| | | | |
|---|---|---|---|
| 6,529,220 B1 * | 3/2003 | Matsumoto | 346/140.1 |
| 6,556,775 B1 * | 4/2003 | Shimada | 386/241 |
| 6,697,082 B1 * | 2/2004 | Takeuchi | 345/629 |
| 7,127,084 B1 * | 10/2006 | Mauk | 382/112 |
| 7,575,330 B2 * | 8/2009 | Allen et al. | 353/85 |
| 7,696,975 B2 * | 4/2010 | Yang et al. | 345/100 |
| 7,932,885 B2 * | 4/2011 | Murade | 345/100 |
| 8,134,627 B2 * | 3/2012 | Jung et al. | 348/311 |
| 8,179,597 B2 * | 5/2012 | Namba et al. | 359/383 |
| 8,500,451 B2 * | 8/2013 | Bronstein et al. | 434/262 |
| 8,864,497 B1 * | 10/2014 | Pollak et al. | 434/37 |
| 2005/0017976 A1 | 1/2005 | Minakuchi et al. | |

FOREIGN PATENT DOCUMENTS

| | | |
|---|---|---|
| JP | 2003-143257 A | 5/2003 |
| WO | 03/038759 A1 | 5/2003 |

OTHER PUBLICATIONS

Application Style vol. 2, a social game information magazine, Apr. 1, 2011, pp. 26-29, East Press Co. Ltd.
International Search Report for PCT/JP2012/064670 dated Jul. 3, 2012.

\* cited by examiner

*Primary Examiner* — Yosef Kassa
(74) *Attorney, Agent, or Firm* — Sughrue Mion, PLLC

(57) ABSTRACT

A storage unit stores an image file that includes a plurality of dummy image data items indicating predetermined dummy images and movement specifying data specifying the movement of an image, and a plurality of display image data items indicating images of characters. A controller replaces each dummy image data item in the image file with a display image data item to generate a new image file and causes a display unit of a terminal apparatus to display the image file.

19 Claims, 9 Drawing Sheets

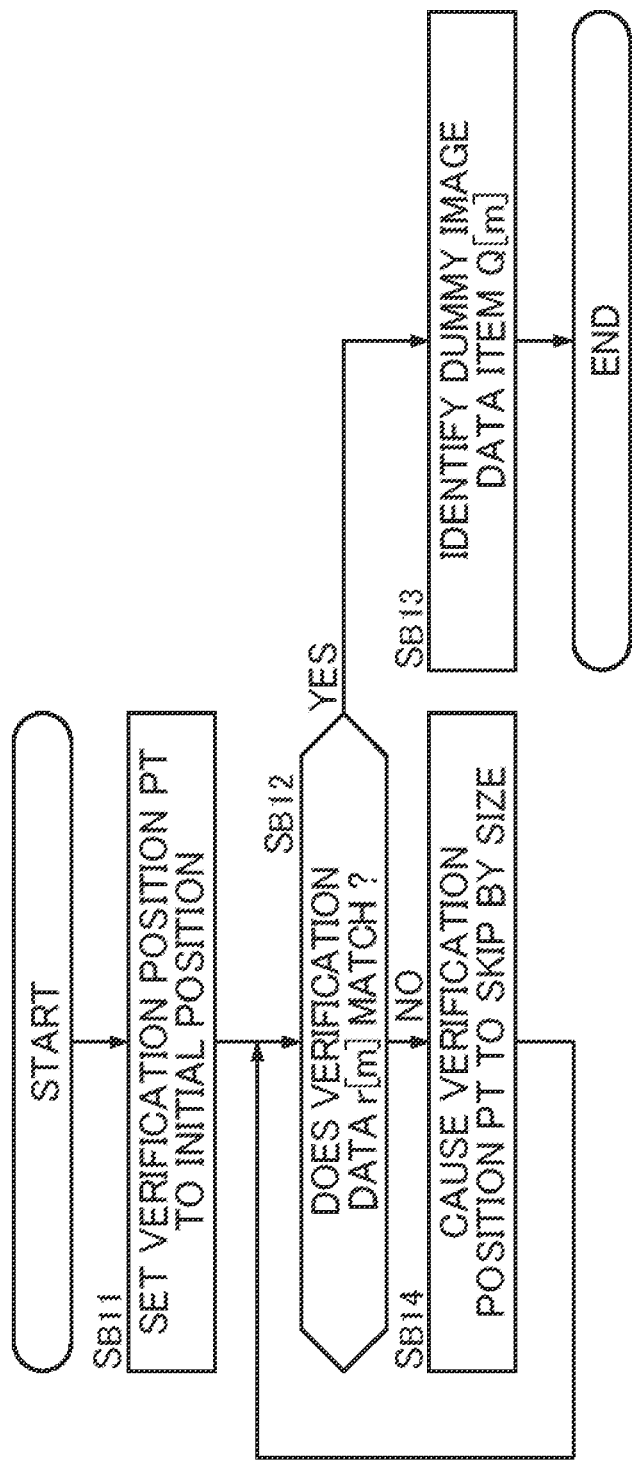

IMAGE-FILE PROCESSING APPARATUS, PROGRAM, AND IMAGE-FILE PROCESSING METHOD

CROSS REFERENCE TO RELATED APPLICATIONS

This application is a National Stage of International Application No. PCT/JP2012/064670 filed Jun. 7, 2012, claiming priority based on Japanese Patent Application No. 2011-176219 filed Aug. 11, 2011, the contents of all of which are incorporated herein by reference in their entirety.

TECHNICAL FIELD

The present invention relates to technologies for processing image files that include image data showing a display-target object and movement specifying data that specifies the movement of the object.

BACKGROUND ART

In a game apparatus (disclosed in Non-Patent Document 1) that displays on a display unit a screen in which a plurality of characters owned by a player do battle against a character of another player, for example, an image file in a specific format (for example, the SWF format), which includes image data showing the characters and movement specifying data that specifies the movement (animation) of the characters, is used.

CITATION LIST

Non-Patent Document

Non-Patent Document 1: Application Style Vol. 2, a social game information magazine, published by East Press Co. Ltd., Apr. 1, 2011, pp. 26-29 (written in Japanese)

SUMMARY OF INVENTION

Technical Problem

A plurality of characters displayed on a display unit can be changed, for example, according to the progress of the game. However, when an image file in a specific format is generated by combining image data of each character and movement specifying data of the character according to a changed combination every time the display-target characters are changed, for example, the processing load can be excessive. Taking this situation into consideration, an object of the present invention is to reduce the processing load of generating an image file that includes image data and movement specifying data.

Solution to Problem

An image-file processing apparatus according to the present invention includes an image identifying section that identifies, from an image file that includes dummy image data indicating an object and movement specifying data specifying the movement of the object, the dummy image data, and an image replacement section that replaces the dummy image data identified by the image identifying section with display image data indicating an object.

It is preferable that the image-file processing apparatus further include an image association section that associates each of a plurality of display image data with each of a plurality of dummy image data included in the image file; that the image identifying section sequentially identify each of the plurality of dummy image data from the image file; and that the image replacement section replace each of the plurality of dummy image data identified by the image identifying section with the display image data associated with the dummy image data by the image association section. Basically, each of the plurality of display image data shows a different image, but the plurality of display image data can have the same image.

It is preferable that the image replacement section replace some of the plurality of display image data in the image file generated when each of the plurality of dummy image data is replaced with the corresponding display image data, with another display image data.

It is preferable that, while the image identifying section changes a verification position in the image file, the image identifying section verify at least a part of each of a plurality of dummy image data for verification that have the same contents as each of the plurality of dummy image data, against the image file to identify each of the plurality of dummy image data in the image file.

It is preferable that the dummy image data include attribute data indicating the size of the dummy image data, and that the image identifying section cause the verification position to skip in the image file according to the size of the dummy image data.

It is preferable that the image file include overall attribute data indicating the size of the image file, and that the image-file processing apparatus further include a data updating section that updates the size indicated by the overall attribute data to the size resulting from the replacement performed by the image replacement section.

The present invention can also be applied to a program for causing a computer to function as the image-file processing apparatus described above. A program of the present invention causes a computer to function as an image identifying section that identifies, from an image file that includes dummy image data indicating an object and movement specifying data specifying the movement of the object, the dummy image data, and an image replacement section that replaces the dummy image data identified by the image identifying section with display image data indicating an object. The program of the present invention is stored in a computer-readable recording medium, is provided in that form, and is installed in a computer. Alternatively, the program of the present invention is distributed through a communication network and is installed in a computer.

The present invention can also be applied to a method for processing an image file. An image-file processing method of the present invention includes identifying, from an image file that includes dummy image data indicating an object and movement specifying data specifying the movement of the object, the dummy image data, and replacing the identified dummy image data with display image data indicating an object.

BRIEF DESCRIPTION OF DRAWINGS

FIG. 8 is a flowchart of a process for identifying a dummy image data item in a second embodiment.

DESCRIPTION OF EMBODIMENTS

First Embodiment

Figure 1:
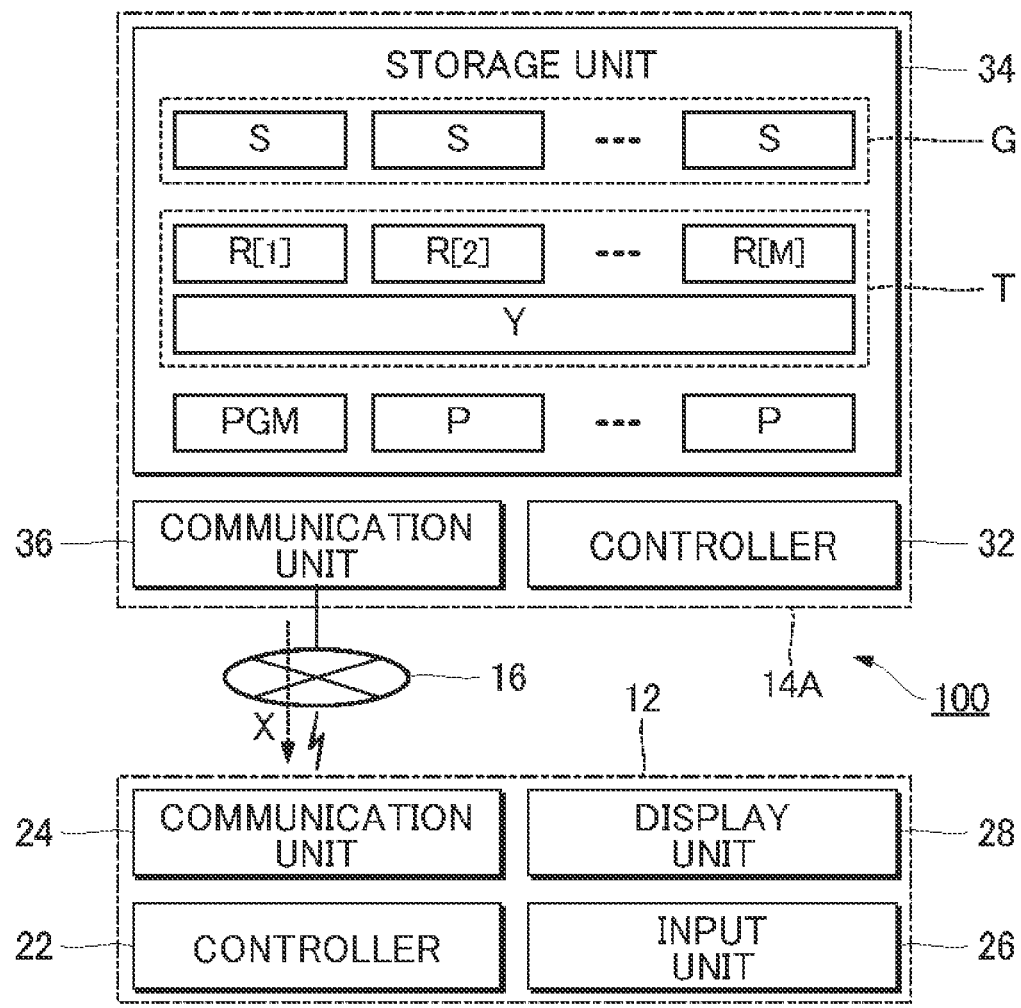
FIG. 1 is a block diagram of a game system according to a first embodiment of the present invention.

FIG. 1 is a block diagram of a game system 100 according to a first embodiment of the present invention. The game system 100 of the first embodiment includes a terminal apparatus 12 and a game apparatus 14A, communicating with each other through a communication network 16 such as the Internet. The player who owns the terminal apparatus 12 plays a game. FIG. 1 shows just one terminal apparatus 12 for convenience, but actually, a plurality of terminal apparatuses 12 communicate with the game apparatus 14A through the communication network 16.

The terminal apparatus 12 is a communication terminal, such as a portable telephone, a personal digital assistant (PDA), or a personal computer, and includes a controller 22, a communication unit 24, an input unit 26, and a display unit 28. The controller 22 comprehensively controls the units of the terminal apparatus 12. The communication unit 24 communicates with the game terminal 14A through the communication network 16. Wireless communication is typically used between the terminal apparatus 12 and the communication network 16, but wired communication is used between the terminal apparatus 12 and the communication network 16 when a desktop personal computer is used as the terminal apparatus 12, for example.

The display unit 28 (such as a liquid crystal display panel) displays various types of images under the control of the controller 22. The input unit 26 is used by the player to input an instruction to the terminal apparatus 12, and includes a plurality of manipulanda operated by the user, for example. A touch sensitive panel integrated with the display unit 28, or a microphone used by the user to input sound to give an instruction to the terminal apparatus 12 can be employed as the input unit 26.

The game apparatus 14A is a web server for providing a browser-based game for the terminal apparatus 12. A browser-based game can be played by executing a web browser in the terminal apparatus 12 (the user does not need to download special game software into the terminal apparatus 12). More specifically, the game apparatus 14A executes various processes when the terminal apparatus 12 sends a request according to an instruction given by the player via the input unit 26 and causes the display unit 28 of the terminal apparatus 12 to display a screen indicating the results of the processes. In the first embodiment, the game apparatus 14A provides the terminal apparatus 12 with a social game of a role-playing game (RPG) type in which the player uses a plurality of characters, such as monsters, given to the player in the game to execute events, such as battles, with another player.

For example, the game apparatus 14A sends an image file X indicating animation in an event, such as a battle event, to the terminal apparatus 12 to cause the display unit 28 of the terminal apparatus 12 to display the image. The image file X is an SWF-format data file conforming to the Flash format (registered trademark). The controller 22 of the terminal apparatus 12 executes dedicated software (Flash player) for processing the SWF-format image file X to display the animation that the communication unit 24 received from the game apparatus 14A, on the display unit 28.

Figure 2:
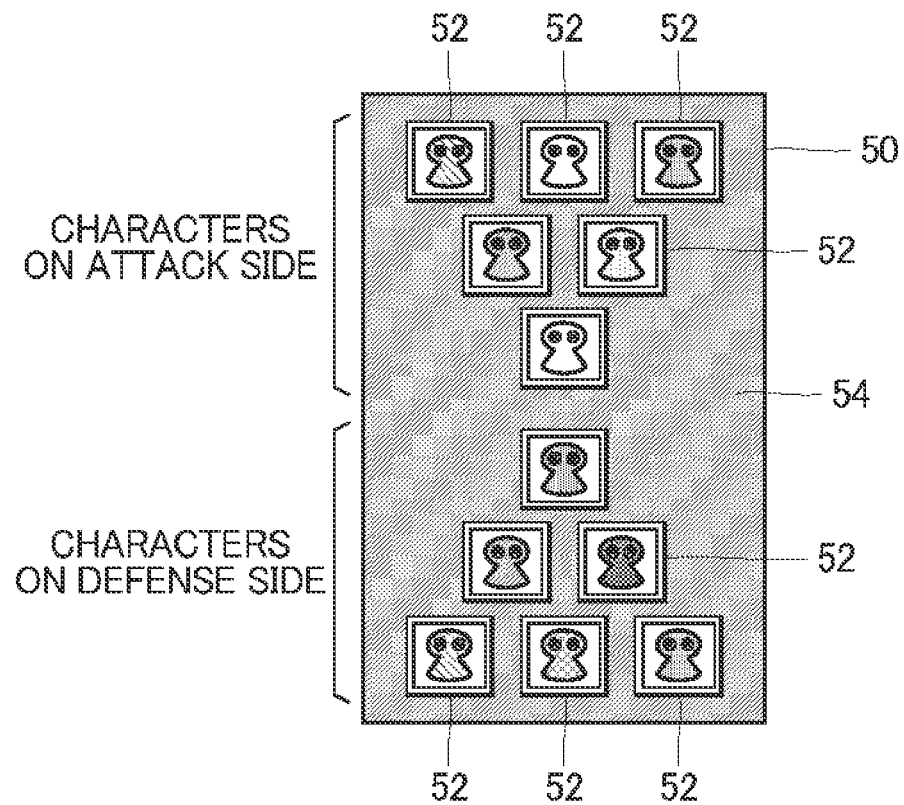
FIG. 2 is a typical view of a battle screen.

FIG. 2 is a typical view of an image in a battle event (hereafter called a battle screen) 50 displayed on the display unit 28 according to an image file X. As shown in FIG. 2, the battle screen 50 shows images 52 of a plurality of characters participating in the battle event in front of a background image 54. More specifically, images 52 of characters on the attack side owned by a player who is on the attack side in the battle event and images 52 of characters on the defense side owned by a player who is on the defense side in the battle event are arranged on the battle screen 50.

Figure 3:
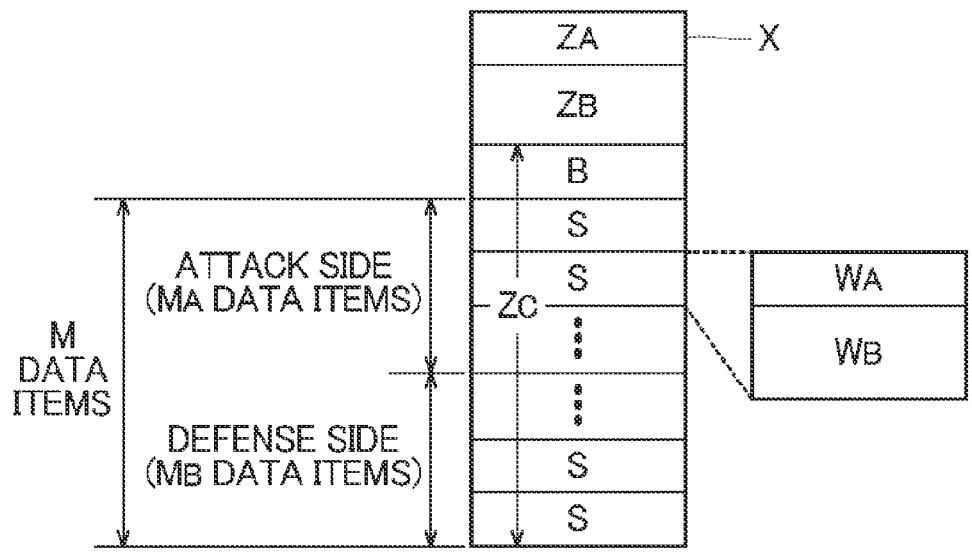
FIG. 3 is a typical view of an image file provided for a terminal apparatus.

FIG. 3 is a view explaining the image file X used to display the battle screen 50. As shown in FIG. 3, the image file X is SWF-format data that includes a header ZA, movement specifying data ZB, and a group of image data ZC. The header ZA is data (overall attribute data) specifying the overall data size of the image file X.

The group of image data ZC is a set of M display image data items S (M is a natural number) corresponding to the characters participating in the battle event, and a background image data item B indicating the background screen 54. The M display image data items S are divided into MA display image data items S corresponding to the characters on the attack side and MB display image data items S corresponding to the characters on the defense side. Each of the display image data items S is SWF-format data that includes a header WA and an image part WB. The header WA is data (attribute data) specifying the data size of the display image data item S. The image part WB represents an image 52 of one character. The image 52 represented by the image part WB and the data size specified by the header WA can be different in each display image data item S.

The movement specifying data ZB is an action script that defines the movement (animation, such as the movement or deformation of the images 52) of the characters indicated by the display image data items S. For example, the movement specifying data ZB specifies a movement in which the images 52 of the characters indicated by the display image data items S move up and down in the battle screen 50 (movement indicating that the characters are active).

As shown in FIG. 1, the game apparatus 14A includes a controller 32, a storage unit 34, and a communication unit 36. The communication unit 36 communicates with the terminal apparatus 12 through the communication network 16. The storage unit 34 stores various types of data (game data P, a group of display images G, and base data T) used by the controller 32 and a program PGM executed by the controller 32. As the storage unit 34, a known recording medium, such as a semiconductor recording medium or a magnetic recording medium, or a combination of a plurality of types of recording media can be used. The storage unit 34 may be installed in an external apparatus (such as a server) separated from the game apparatus 14A, and the game apparatus 14A may acquire information from the storage unit 34 through the communication network 16. In other words, the storage unit 34 is not essential for the game apparatus 14A. The storage unit 34 (one virtual storage unit) may be realized with a plurality of units configured separately from each other.

The game data P is generated for each player and indicates the progress of the game for the player. For example, the game data P specifies a plurality of characters owned by the player. The group of display images G is a set of display image data items S of all types of characters that can appear in the game. The display image data items S of the group of display images G are stored in the storage unit 34 as mutually independent files and processed individually.

Figure 4:
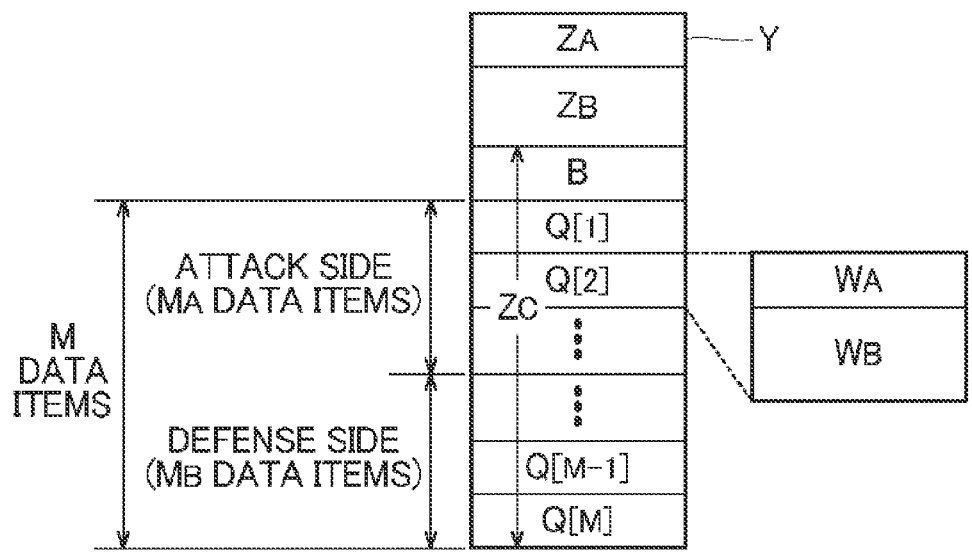
FIG. 4 is a typical view of an image file in base data.

The base data T includes an image file Y and M dummy image data items for verification R (R[1] to R[M]) and is used for generating the image file X. FIG. 4 is a view explaining the image file Y. In the same way as the image file X, the image file Y is an SWF-format data file that includes a header ZA, movement specifying data ZB, and a group of image data ZC. The image file Y is used as a template for generating the image file X. The header ZA of the image file Y specifies the overall data size of the image file Y. The group of image data ZC of the image file Y is a set of M dummy image data items Q (Q[1] to Q[M]) and a background image data item B indicating the background screen 54 of the battle screen 50.

The M dummy image data items Q (Q[1] to Q [M]) are divided into MA dummy image data items Q corresponding to the characters on the attack side and MB dummy image data items Q corresponding to the characters on the defense side. In the same way as the display image data items S, each of the dummy image data items Q is SWF-format data that includes a header WA specifying the data size of the display image data item Q and an image part WB representing a predetermined dummy image. The content of the dummy image represented by the image part WB and the data size specified by the header WA differ for each dummy image data item Q. In outline, the M dummy image data items Q (Q[1] to Q[M]) of the image file Y are replaced with the display image data items S of characters participating in the battle event in the group of display images G to generate the image file X. In other words, until each dummy image data item Q of the image file Y is replaced with the display image data item S of a character actually participating in the battle event, the dummy image data item is provisional data (dummy data).

The M dummy image data items for verification R {R[1] to R[M]) in the base data T shown in FIG. 1 correspond one-to-one to the dummy image data items Q of the image file Y. More specifically, each dummy image data item for verification R[m] (m=1 to M) has the same content as the dummy image data item Q[m] corresponding to that dummy image data item for verification R[m], among the M dummy image data items Q[1] to Q[M] of the image file Y. The dummy image data items for verification R are stored in the storage unit 34 as mutually independent files and can be processed individually. The M dummy image data items for verification R are divided into MA dummy image data items for verification R corresponding to the characters on the attack side and MB dummy image data items for verification R corresponding to the characters on the defense side.

Figure 5:
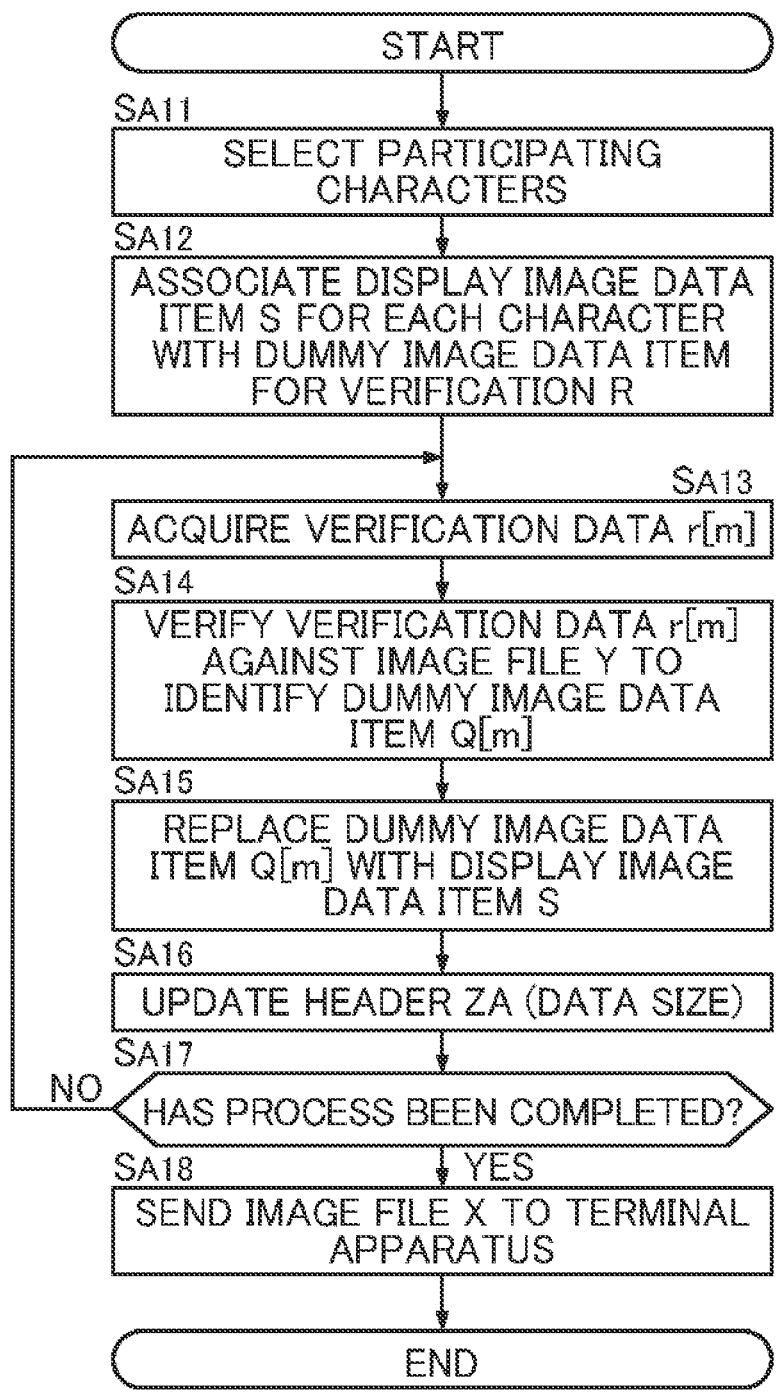
FIG. 5 is a flowchart of a process for generating an image file.

FIG. 5 is a flowchart of a process for generating the image file X from the base data T (the image file Y and the M dummy image data items for verification R) stored in the storage unit 34. The process shown in FIG. 5 is executed every time the player gives an instruction to start a battle event by operating the input unit 26.

When the process shown in FIG. 5 starts, the controller 32 selects a plurality of characters that will participate in a battle event (step SA11). Specifically, the controller 32 selects up to MA characters on the attack side and up to MB characters on the defense side. The characters on the attack side are selected from the plurality of characters indicated by the game data P of a player on the attack side, and the characters on the defense side are selected from the plurality of characters indicated by the game data P of a player on the defense side. Since the characters owned by each player are changed (added or removed), as needed, as the game advances, the characters participating in the battle event can be changed in every battle event.

Figure 6:
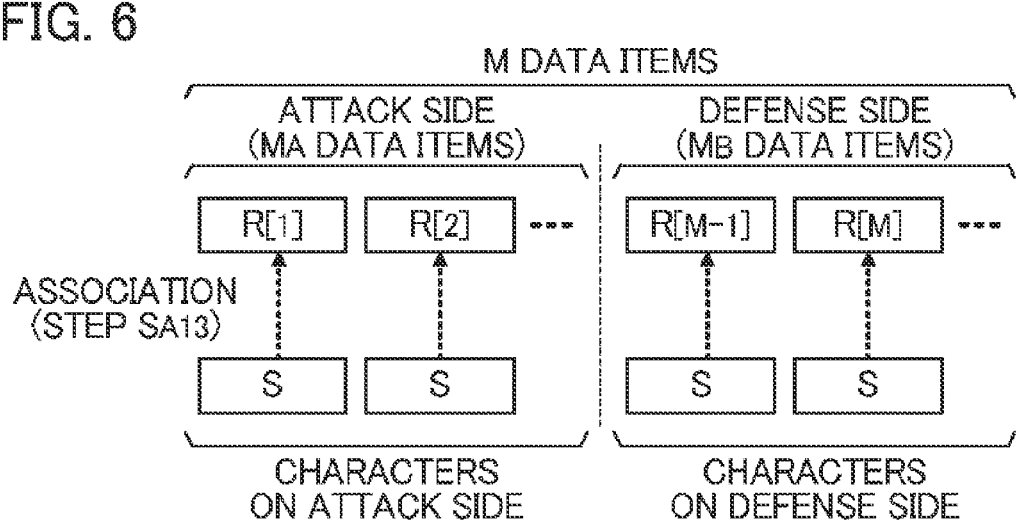
FIG. 6 is a view explaining the assignment of display image data items to dummy image data items for verification.

As shown in FIG. 6, the controller 32 associates the display image data items S of the characters selected in step SA11 among the plurality of display image data items S of the group of display images G stored in the storage unit 34 with the M dummy image data items for verification R[1] to R[M] in the base data T on a one-to-one basis (step SA12). More specifically, the controller 32 associates the display image data items S of the characters on the attack side selected in step SA11 with the MA dummy image data items for verification R corresponding to the characters on the attack side in the order of attack power of the characters, for example. In the same manner, the controller 32 associates the display image data items S of the characters on the defense side selected in step SA11 with the MB dummy image data items for verification R corresponding to the characters on the defense side in the order of defense power of the characters, for example.

When the number of characters on the attack side selected in step SA11 is smaller than MA (for example, the number of characters owned by the player is small), the display image data items S containing a predetermined transparent image are associated with the dummy image data items for verification R to which no display image data items S are assigned among the MA dummy image data items for verification R on the attack side. The same operation is also applied to the MB dummy image data items for verification R on the defense side. Since the dummy image data items for verification R correspond to the dummy image data items Q in the image file Y on a one-to-one basis, the process in step SA12 can mean a process of associating the display image data items S with the dummy image data items Q of the image file Y on a one-to-one basis. As understood from the above description, when the controller 32 executes the process in step SA12, an element (image association section) for associating the display image data items S with the dummy image data items Q is implemented.

The controller 32 executes a process of replacing the M dummy image data items Q[1] to Q[M] of the image file Y with the display image data items S that were associated with the dummy image data items Q[m] (the dummy image data items for verification R[m]) in step SA12 (steps SA13 to SA17). Since the dummy image data items Q[m] have variable lengths, it is difficult to identify the boundaries of the M dummy image data items Q[1] to Q[M] only from the image file Y. To solve this issue, in the first embodiment, the image file Y is verified with the dummy image data items for verification R[m] to identify the dummy image data items Q[m] in the image file Y.

Figure 7A:
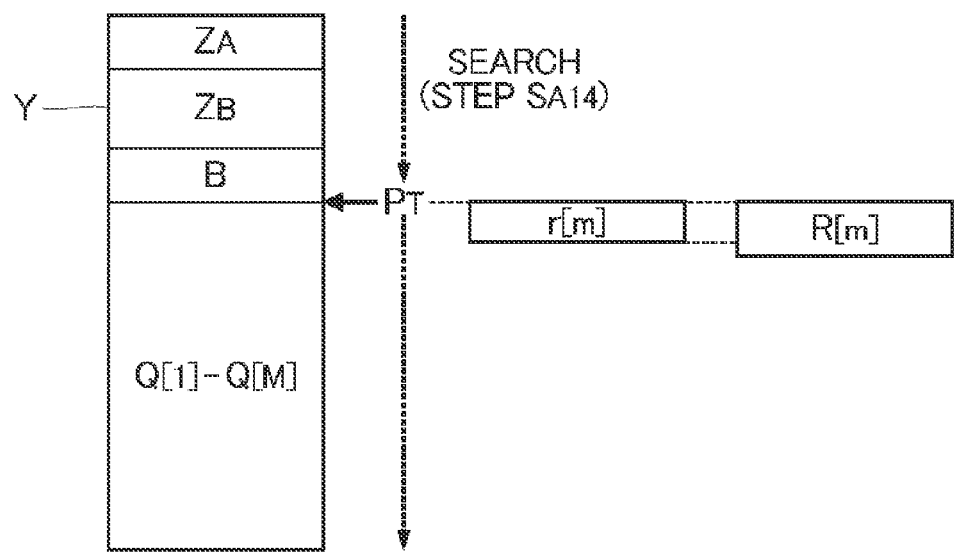
FIG. 7A is a view explaining the process for generating the image file.
Figure 7B:
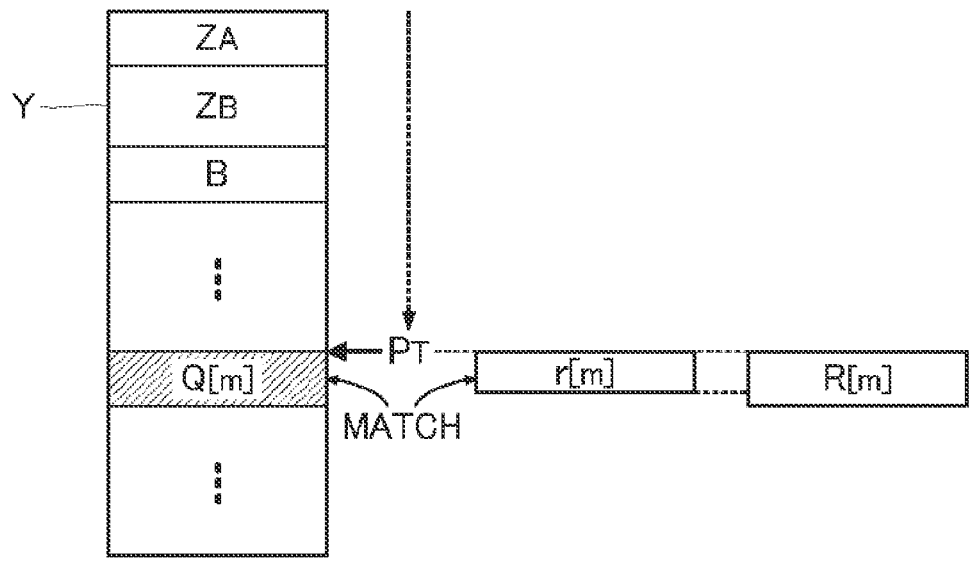
FIG. 7B is a view explaining the process for generating the image file.

The controller 32 select one dummy image data item for verification R[m] from the M dummy image data items for verification R[1] to R[M] and extracts a part r[m] of that dummy image data item for verification R[m] (hereafter called verification data) (step SA13). As shown in FIG. 7A, the verification data r[m] is a portion starting from the top of the dummy image data item for verification R[m] and having a predetermined length, for example.

As shown in FIG. 7A, the controller 32 sequentially moves a verification position PT (pointer) from the top to the bottom in the image file Y by a predetermined unit amount to verify the verification data r[m] against the image file Y. The controller 32 searches the image file Y for a portion that matches the verification data r[m], and identifies one dummy image data item Q[m] that includes a portion that matches the verification data r[m] (hereafter called a searched-for dummy image data item Q[m]) (step SA14). Specifically, a part starting from the top of the portion that matches the verification data r[m] and having the data size specified by the header WA of the dummy image data item for verification R[m] in the image file Y is identified as the dummy image data item Q[m]. As understood from the above description, when the controller 32 executes the process in step SA14, an element (image identifying section) for identifying the dummy image data item Q[m] in the image file Y is implemented.

Figure 7C:
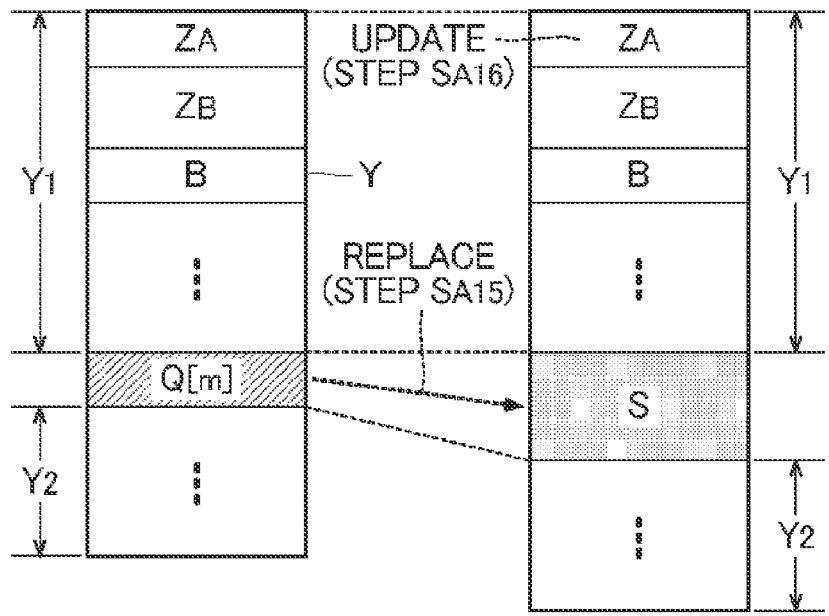
FIG. 7C is a view explaining the process for generating the image file.

When one searched-for dummy image data item Q[m] is identified in the above procedure, the controller 32 replaces the searched-for dummy image data item Q[m] with the display image data item S that was associated with the searched-for dummy image data item Q[m] (the dummy image data items for verification R[m]) in step SA12, as shown in FIG. 7C (step SA15). Since the searched-for dummy image data item Q[m] in the image file Y can have a different data size from the display image data item S, the dummy image data item Q cannot be simply overwritten with the display image data item S. Therefore, as shown in FIG. 7C, the controller 32 couples the display image data item S to the zone Y1 from the top of the image file Y to the point immediately before the searched-for dummy image data item Q[m] and couples the zone Y2 from the point immediately after the end of the searched-for image data item Q[m] in the image file Y to the bottom of the image file Y, to the display image data item S, to replace the searched-for dummy image data item Q[m] with the display image data item S. As understood from the above description, when the controller 32 executes the process shown in step SA15, an element (image replacement section) for replacing the dummy image data item (searched-for dummy image data item) Q[m] in the image file Y with the display image data item S is implemented.

Since the searched-for dummy image data item Q[m] can have a different data size from the display image data item S, when the dummy image data item Q[m] is replaced with the display image data item S, the overall data size of the image file Y is changed. Therefore, the controller 32 updates the data size of the image file Y indicated by the header ZA of the image file Y to the data size of the image file Y obtained after the dummy image data item Q[m] is replaced (after step SA15 is executed) (step SA16). As understood from the above description, when the controller 32 executes the process shown in step SA16, an element (data updating section) for updating the data size of the image file Y indicated by the header ZA is implemented.

The controller 32 determines whether the processes in steps SA13 to SA16 (replacement with the display image data item S) have been completed for all of the M dummy image data items Q[1] to Q[M] in the image file Y (step SA17). If the result in step SA17 is negative (an unprocessed dummy image data item Q[m] remains), the controller 32 selects one unprocessed dummy image data item for verification R[m] and executes the processes in steps SA13 to SA16. If the processes have been completed for the M dummy image data items Q[1] to Q[M] (Yes in step SA17), the controller 32 sends the image file Y in which all of the M dummy image data items Q[1] to Q[M] have been replaced with the display image data items S of the characters from the communication unit 36 to the terminal apparatus 12 as the image file X (step SA18).

As described above, since each dummy image data item Q in the existing image file Y is replaced with the corresponding display image data item S to generate the image file X in the first embodiment, it is possible to reduce the processing load for generating the image file X. In addition, since each dummy image data item Q in the image file Y is replaced with the corresponding display image data item S to generate the image file X, the movement specifying data ZB in the image file Y is used again as data specifying the movement of the image 52 in each display image data item S, after replacement. Therefore, an advantage is provided in that the processing load for generating the image file X is reduced, compared with a case in which movement specifying data ZB for specifying the movement of the image 52 indicated by each display image data item S is newly generated when the image file X is generated.

Since each of the plurality of dummy image data items Q (Q[1] to Q[M]) in the image file Y is replaced with the corresponding display image data item S, an image file X showing various images can be generated, compared with a case in which one dummy image data item Q in the image file Y is replaced with the display image data item S.

In the first embodiment, since the dummy image data item for verification R is verified against the image file Y to identify the dummy image data item Q[m] in the image file Y, even when the boundaries of each dummy image data item Q[m] are unknown in the image file Y, for example, the dummy image data item Q[m] can be replaced with the display image data item S to generate a new image file X. In particular, in the first embodiment, since a part of the dummy image data item for verification R[m], that is, the verification data r[m], is verified against the image file Y, an advantage is provided in that the processing load is reduced, compared with a case in which the whole of the dummy image data item for verification R[m] is verified against the image file Y. However, the whole of the dummy image data item for verification R[m] can be verified against the image file Y.

In the first embodiment, since the header ZA, which indicates the size of the image file Y, is updated to the size obtained after each dummy image data item Q[m] is replaced, a new image file X generated with the replacement of each dummy image data item Q[m] can be appropriately displayed.

Second Embodiment

A second embodiment of the present invention will be described below. Note that, for elements in the following example embodiments having the same effects or functions as in the first embodiment, the reference symbols used in the above description will be used again, and detailed descriptions thereof will be omitted, if unnecessary.

In the first embodiment, the verification position PT is sequentially moved in the image file Y by the predetermined unit amount to verify the verification data r[m] against the image file Y to search for the dummy image data item Q[m]. In the second embodiment, the verification position PT is moved (skipped) by an amount corresponding to the data size specified by the header WA of the dummy image data item Q[m] to verify the verification data r[m] against the image file Y.

FIG. 8 is a flowchart of a process in which a controller 32 of the second embodiment executes the step SA14 shown in FIG. 5. When the step SA14 starts, the controller 32 sets the verification position PT to the position of the header WA of the first dummy image data item Q[1] among the M dummy image data items Q[1] to Q[M] in the image file Y (the initial position) (step SB11).

The controller 32 verifies the verification data r[m] at the verification position PT in the image file Y to determine whether the verification data r[m] matches a part of the image file Y (step SB12). If the verification data r[m] matches a part of the image file Y (Yes in step SB12), the controller 32 identifies the part starting from the current verification position PT and having the data size specified by the header WA in the image file Y as the dummy image data item Q[1] (step SB13). The same processes (steps SA15 to SA18) as in the first embodiment are executed after the dummy image data item Q[m] is identified.

Figure 9:
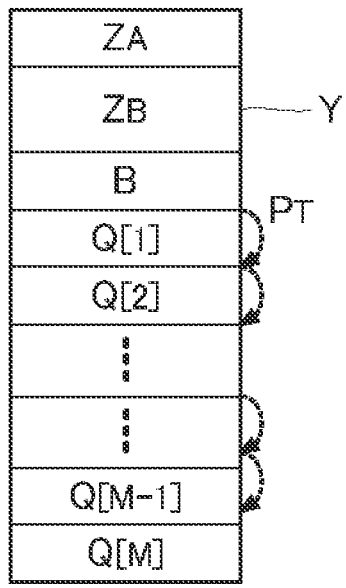
FIG. 9 is a view explaining a verification position in the second embodiment.

In contrast, if the verification data r[m] does not match a part of the image file Y (No in step SB12), the controller 32 causes the verification position PT to skip from the current verification position PT by the data size specified by the header WA (the data size of the dummy image data item Q[1]) (step SB14). In other words, as shown in FIG. 9, the verification position PT jumps from the top of the dummy image data item Q[1] to the top of the dummy image data item Q[2], which comes immediately thereafter. Then, the controller 32 verifies the verification data r[m] against the image file Y at the verification position PT obtained after the movement, to determine whether the verification data r[m] matches a part of the image file Y (step SB12). In the first embodiment, the verification position PT is moved by the predetermined unit amount, whereas, in the second embodiment, the verification position PT is moved from the top of the dummy image data item Q[m] to the top of the dummy image data item Q[m+1], which comes immediately thereafter, and the verification data r[m] is verified against the image file Y.

The second embodiment achieves the same advantages as the first embodiment. Since the verification position PT is skipped by the data size specified by the header WA of each dummy image data item Q in the second embodiment, an advantage is provided in that the processing load for generating the image file X (especially the process of identifying each dummy image data item Q from the image file Y) is reduced, compared with the first embodiment, where the verification position PT is moved by the predetermined unit amount and the dummy image data item for verification [R] (verification data r[m]) is verified against the image file Y.

Third Embodiment

In the first embodiment, the image file X is generated from the image file Y every time the user gives an instruction to start a battle event, taking into consideration the fact that the combination of characters participating in the battle event can be changed in each event. In a third embodiment, the image file X1 generated from the image file Y in the process shown in FIG. 5 is stored in the storage unit 34 for each player, and the image file X1 stored in the storage unit 34 is partially changed to generate an image file X2 to be used in the next battle event.

Figure 10:
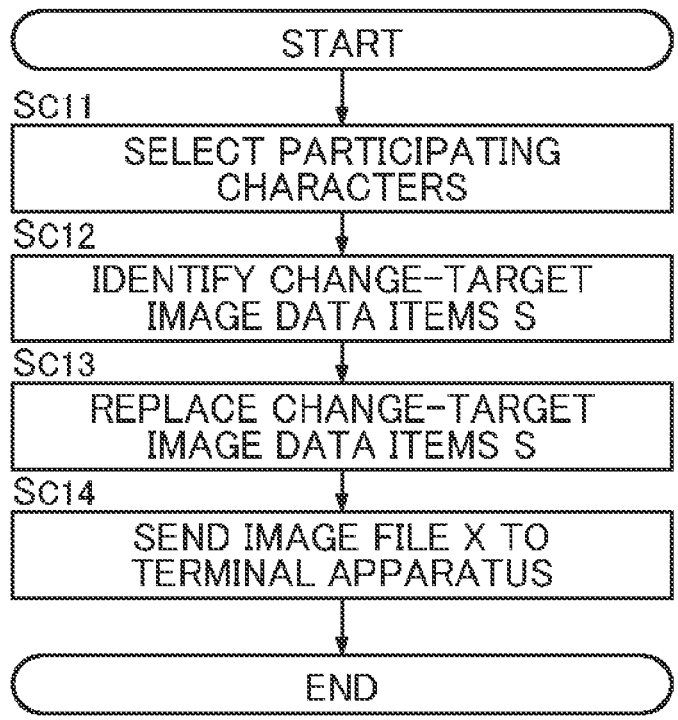
FIG. 10 is a flowchart of a process for generating an image file in a third embodiment.
Figure 11:
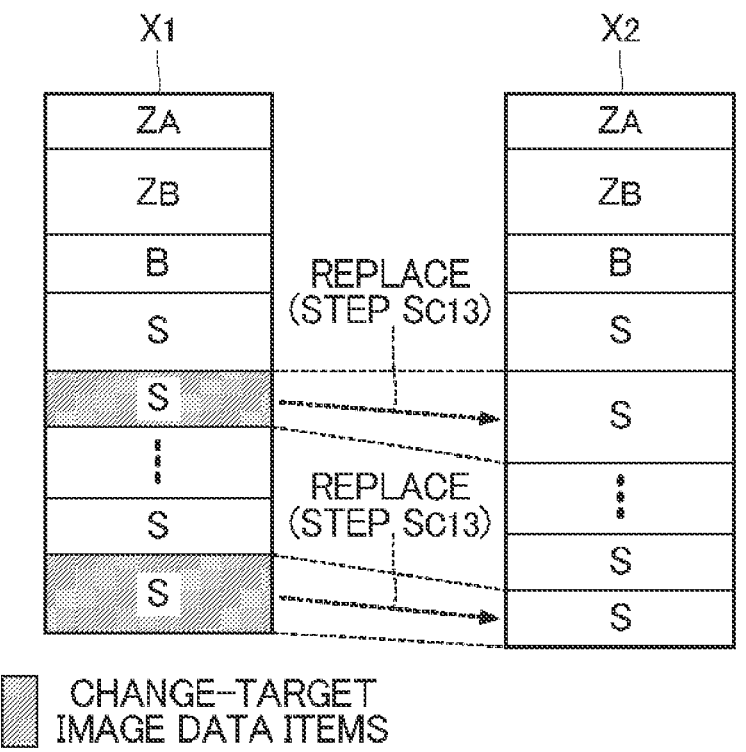
FIG. 11 is a view explaining the process for generating the image file in the third embodiment.

FIG. 10 is a flowchart of a process in which a controller 32 of the third embodiment generates the image file X2 from the existing image file X1. FIG. 11 is a view explaining the process shown in FIG. 10. When the user gives an instruction to start a battle event after the process for generating the image file X from the image file Y, shown in FIG. 5, is executed, the process shown in FIG. 10 starts. In the third embodiment, when the process shown in FIG. 5 is executed, the M display image data items S of the respective characters selected in step SA11 (that is, the display image data items S used to replace the dummy image data items Q[1] to Q[M]) are stored in the storage unit 34 as new dummy image data items R (R[1] to R[M]) together with the image file X1, for each player.

When the process shown in FIG. 10 starts, the controller 32 selects a plurality of characters participating in the current battle event (step SC11). The characters participating in a battle event can be changed in each battle event. The controller 32 identifies the display image data items S (hereafter called change-target image data items S) of one or more characters different from the characters selected in step SC11, among the M display image data items S of the existing image file X1 stored in the storage unit 34 (step SC12). More specifically, each of the change-target image data items S is identified by verifying a part of the dummy image data item for verification R[m], that is, verification data r[m], stored in the storage unit 34 for a change-target character, against the image file X1. The same method as in step SA14 in the first embodiment is used to verify the verification data r[m] against the image file X1. In FIG. 11, change-target image data items S are hatched among the M display image data items S of the image file X1.

As shown in FIG. 11, the controller 32 replaces each change-target image data item S identified in the M display image data items S in the image file X1 with the display image data item S of a character selected in step SC11 and not included in the image file X1 in the group of display images G to generate a new image file X2 (step SC13). The method for replacing with the display image data item S is the same as the method for replacing the dummy image data item Q[m] with the corresponding display image data item S (step SA15) in the first embodiment. The display image data items S other than the change-target image data items S among the M display image data items S in the image file X1 are also used in the image file X2. Each dummy image data item for verification R[m] verified against the image file X1 in step SC12 is updated to the corresponding display image data item S used in the replacement in step SC13.

The third embodiment also achieves the same advantages as the first embodiment. In the third embodiment, since some of the M display image data items S (change-target image data items S) in the generated image file X1 are replaced with other display image data items S to generate a new image file X2, an advantage is provided in that the processing load of the controller 32 is reduced, compared with a case where the process shown in FIG. 5 is executed every time a battle event happens, in which all of the M dummy image data items Q[1] to Q[M] in the image file Y are replaced with display image data items S.

Fourth Embodiment

Figure 12:
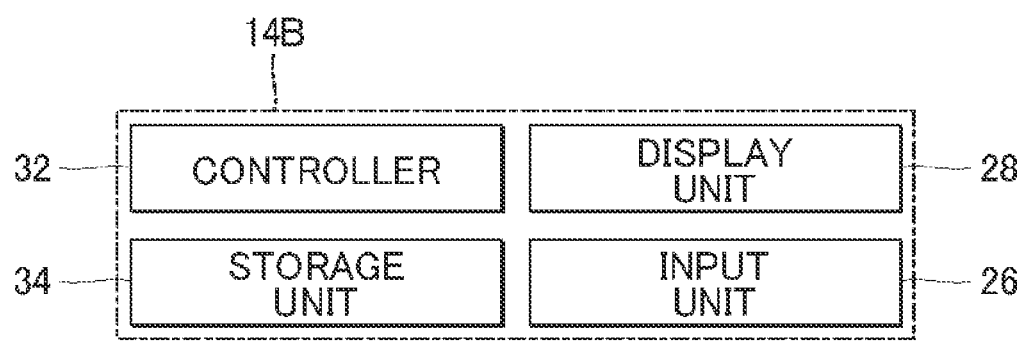
FIG. 12 is a block diagram of a game apparatus according to a fourth embodiment.

FIG. 12 is a block diagram of a game apparatus 14B according to a fourth embodiment. With the game apparatus 14B, the player (owner) can play the same game as in the first embodiment. A portable device, such as a portable telephone or a personal digital assistant, is suitable as the game apparatus 14B. As shown in FIG. 12, the game apparatus 14B includes a controller 32, a storage unit 34, an input unit 26, and a display unit 28.

The storage unit 34 stores a program PGM, game data P, base data T, and a group of display images G in the same way as in the first embodiment. The controller 32 executes the program PGM to operate in the same manner as in the first embodiment. Specifically, the controller 32 generate an image file X by replacing each dummy image data Q included in an image file Y of the base data T with display image data S in the group of display images G. The display unit 28 displays the battle screen shown in FIG. 2 according to the image file X generated by the controller 32.

As understood from the above description, the game apparatus 14B of the fourth embodiment functions as a device that provides, by itself, the player with the game provided by the game apparatus 14A of the first embodiment. Therefore, the fourth embodiment also achieves the same advantages as the first embodiment. The configuration of the second embodiment or the third embodiment can be applied to the fourth embodiment.

Modifications

The embodiments described above can be modified in various ways. Specific example modifications will be described below. Two or more of the following modifications selected in a desired manner can be appropriately combined in a range in which no mutual contradiction occurs.

(1) In the embodiments described above, the image file X, which indicates the battle screen 50 of a battle event, is generated, but the image file X can indicate any desired image contents. For example, the embodiments described above can also be applied to the generation of an image file X for an event in which the player acquires an item or a character (such as an event in which a dungeon is searched). The embodiments described above assume a battle event, so that the display image data items S indicate the characters in the game. However, the display image data items can indicate any desired image contents. For example, depending on the image indicated by the image file X, the display image data items S can indicate items and other things in the game. In other words, the dummy images indicated by the dummy image data items Q and the characters or items indicated by the display image data items S can be collectively called objects.

(2) In the embodiments described above, one type of base data T is stored in the storage unit 34. However, a plurality of different base data items T can be prepared. In that case, the controller 32 uses one base data T selected from the plurality of base data items T with a predetermined rule, and executes the same processes as in the embodiments described above to generate the image file X.

(3) In the embodiments described above, the image file Y, the dummy image data items for verification R, and the display image data items S are stored in the single storage unit 34. However, each of these materials can be stored in separate storage units 34. Moreover, the functions of the game apparatus 14A can be distributed to a plurality of apparatuses.

(4) In the embodiments described above, a configuration of the present invention in which the image file X is generated from the image file Y is applied to the game apparatus 14 (14A or 14B). However, the application range of the present invention is not limited to the game apparatus 14. The present invention can be suitably applied to technologies for generating the image file X from the image file Y (such as an image-file processing apparatus and an image-file processing method).

DESCRIPTION OF REFERENCE NUMERALS

100: Game system
12: Terminal apparatus
14A, 14B: Game apparatus
16: Communication network
22: Controller
24: Communication unit
26: Input unit
28: Display unit
32: Controller
34: Storage unit
36: Communication unit

The invention claimed is:

1. An image-file processing apparatus comprising:
an image identifying section that identifies, from an image file that includes dummy image data indicating an object and movement specifying data specifying the movement of the object, the dummy image data; and
an image replacement section that replaces the dummy image data identified by the image identifying section with display image data indicating an object.

2. The image-file processing apparatus according to claim 1, further comprising an image association section that associates each of a plurality of display image data with each of a plurality of dummy image data included in the image file,
wherein the image identifying section sequentially identifies each of the plurality of dummy image data from the image file; and
the image replacement section replaces each of the plurality of dummy image data identified by the image identifying section with the display image data associated with the dummy image data by the image association section.

3. The image-file processing apparatus according to claim 2, further comprising a data updating section,
wherein the image file includes overall attribute data indicating the size of the image file; and
the data updating section updates the size indicated by the overall attribute data to the size resulting from the replacement performed by the image replacement section.

4. The image-file processing apparatus according to claim 2, wherein the image replacement section replaces some of the plurality of display image data in the image file generated when each of the plurality of dummy image data is replaced with the corresponding display image data, with another display image data.

5. The image-file processing apparatus according to claim 4, further comprising a data updating section,
wherein the image file includes overall attribute data indicating the size of the image file; and
the data updating section updates the size indicated by the overall attribute data to the size resulting from the replacement performed by the image replacement section.

6. The image-file processing apparatus according to claim 2, wherein, while the image identifying section changes a verification position in the image file, the image identifying section verifies at least a part of each of a plurality of dummy image data for verification that have the same contents as each of the plurality of dummy image data, against the image file to identify each of the plurality of dummy image data in the image file.

7. The image-file processing apparatus according to claim 6, wherein the dummy image data includes attribute data indicating the size of the dummy image data; and
the image identifying section causes the verification position to skip in the image file according to the size of the dummy image data.

8. The image-file processing apparatus according to claim 7, further comprising a data updating section,
wherein the image file includes overall attribute data indicating the size of the image file; and
the data updating section updates the size indicated by the overall attribute data to the size resulting from the replacement performed by the image replacement section.

9. The image-file processing apparatus according to claim 6, further comprising a data updating section,
   wherein the image file includes overall attribute data indicating the size of the image file; and
   the data updating section updates the size indicated by the overall attribute data to the size resulting from the replacement performed by the image replacement section.

10. The image-file processing apparatus according to claim 1, further comprising a data updating section,
    wherein the image file includes overall attribute data indicating the size of the image file; and
    the data updating section updates the size indicated by the overall attribute data to the size resulting from the replacement performed by the image replacement section.

11. The image-file processing apparatus according to claim 1, further comprising an image association section that associates each of a plurality of display image data with each of a plurality of dummy image data included in the image file.

12. The image-file processing apparatus according to claim 11, wherein the image identifying section identifies each of the plurality of dummy image data from the image file; and the image replacement section replaces each of the plurality of dummy image data identified by the image identifying section with the display image data associated with the dummy image data by the image association section.

13. A non-transitory computer readable medium having stored thereon a program for causing a computer to function as:
    an image identifying section that identifies, from an image file that includes dummy image data indicating an object and movement specifying data specifying the movement of the object, the dummy image data; and
    an image replacement section that replaces the dummy image data identified by the image identifying section with display image data indicating an object.

14. An image-file processing method comprising:
    identifying, from an image file that includes dummy image data indicating an object and movement specifying data specifying the movement of the object, the dummy image data; and
    replacing the identified dummy image data with display image data indicating an object.

15. The image-file processing apparatus according to claim 4, wherein, while the image identifying section changes a verification position in the image file, the image identifying section verifies at least a part of each of a plurality of dummy image data for verification that have the same contents as each of the plurality of dummy image data, against the image file to identify each of the plurality of dummy image data in the image file.

16. The image-file processing apparatus according to claim 15, wherein the dummy image data includes attribute data indicating the size of the dummy image data; and
    the image identifying section causes the verification position to skip in the image file according to the size of the dummy image data.

17. The image-file processing apparatus according to claim 16, further comprising a data updating section,
    wherein the image file includes overall attribute data indicating the size of the image file; and
    the data updating section updates the size indicated by the overall attribute data to the size resulting from the replacement performed by the image replacement section.

18. The image-file processing apparatus according to claim 15, further comprising a data updating section,
    wherein the image file includes overall attribute data indicating the size of the image file; and
    the data updating section updates the size indicated by the overall attribute data to the size resulting from the replacement performed by the image replacement section.

19. An image-file processing apparatus for generating a new image file, comprising:
    at least one memory operable to store program code; and
    at least one processor operable to read said program code and operate as instructed by said program code, the at least one processor:
      receiving a base image template file that includes a plurality of dummy image data each indicating an object and movement specifying data specifying the movement of the object;
      scanning the base image template file and identifying the plurality of dummy image data in the base image file template;
      associating each of a plurality of display image data with each of the plurality of dummy image data included in the base image file template;
      continuing scanning until no further dummy image data is found in the base image file template, and
      creating a new data file by replacing each of the identified plurality of dummy image data with the display image data associated with the dummy image data.

* * * * *